United States Patent [19]

Pigott

[11] Patent Number: 4,625,836
[45] Date of Patent: Dec. 2, 1986

[54] LOCKING DEVICE FOR MOVABLE ARM ASSEMBLY

[75] Inventor: Norman B. Pigott, Bishops Stortford, England

[73] Assignee: Robotic Systems Limited, Mildenhall, England

[21] Appl. No.: 549,318

[22] Filed: Nov. 7, 1983

[30] Foreign Application Priority Data

Nov. 10, 1982 [GB] United Kingdom ................. 8232077

[51] Int. Cl.$^4$ .......................... B25J 9/14; F16D 51/08
[52] U.S. Cl. ........................................ 188/67; 60/593; 901/14; 901/49
[58] Field of Search .................. 188/67, 74, 75, 76, 188/78, 84, 365, 366, 367, 368, 265, 151 R, 77 R; 303/49; 414/730; 901/14, 49; 70/181; 74/531; 92/17, 27; 60/593

[56] References Cited

U.S. PATENT DOCUMENTS

| 2,257,610 | 9/1941 | Kraft | 188/367 X |
| 2,930,453 | 3/1960 | McNamara | 188/78 |
| 2,998,869 | 9/1961 | Adams | 303/49 |
| 3,205,019 | 9/1965 | La Rocca | 303/49 |
| 3,338,340 | 8/1967 | Oesterreicher | 188/75 |
| 3,717,231 | 2/1973 | Kaufeldt | 901/49 X |

FOREIGN PATENT DOCUMENTS

| 733564 | 10/1932 | France | 188/367 |
| 676764 | 7/1979 | U.S.S.R. | 60/593 |
| 848349 | 7/1981 | U.S.S.R. | 414/730 |

Primary Examiner—Douglas C. Butler
Assistant Examiner—Richard R. Diefendorf
Attorney, Agent, or Firm—Louis Weinstein

[57] ABSTRACT

An articulated joint, for example in a robot arm, has a braking device which can brake movement in the joint when desired, so that forces transmitted across the joint are not transmitted through the mechanism which moves the arm. The braking device has an annular expandable, for example tubular, element which is positioned between concentric facing surfaces on either side of the joint, i.e. on the arm and on the part of the robot to which the arm is articulated. Hydraulic pressure can be applied to the expandable element to cause it to expand and lock together the concentric surfaces.

5 Claims, 2 Drawing Figures

LOCKING DEVICE FOR MOVABLE ARM ASSEMBLY

This invention concerns locking devices for movable arm assemblies such as robot arm assemblies. The invention also concerns robots having arm assemblies including locking devices.

BACKGROUND TO THE INVENTION

In movable arm assemblies such as robot arms it is just as important to be able to lock the different elements making up the arm assembly as it is to provide for relative movement therebetween. It will be appreciated that if an arm is having to perform a particular task and the outboard end of the arm is not locked rigidly in position, the work which the arm is being asked to be undertaken may suffer.

In many robot arms, such as in spot welding robots, considerable forces have to be transmitted through the arms, and across articulated arm joints to the arm ends. In order to be able to transmit these force, the components making up the articulated joints have to be much more substantial than is required merely to provide an articulation function. Furthermore, the necessity to transmit these forces exposes the articulated joints to possible damage.

It is an object of the present invention to provide a locking device for use in such arms.

SUMMARY OF THE INVENTION

A locking device for locking up a movable arm assembly such as a robot arm assembly in which a movable arm element pivots relative to a support therefor. It comprises an expandable annular element located directly between radially separated opposed annular faces which respectively move with movable arm element and form part of the support therefor, the expandable element having a fluid connection leading thereto from a reservoir of an incompressible fluid such as oil, and means for supplying fluid under pressure to the interior of the expandable element to expand same and cause the movable arm element to lock relative to the support therefor until the fluid pressure is released.

In one preferred arrangement, the expandable element is located between an external cylindrical surface of a knuckle at the inboard end of the movable arm element and an outer bounding sleeve forming part of or attached to the support for the movable arm element.

In another arrangement, the annular expandable element is sandwiched between the internal cylindrical face of a circular recess formed at an end face of one end of the movable arm element which is located within the support therefor, and wherein the support includes a cylindrical protrusion which fits into the recess and provides an external cylindrical surface for the expandable element.

In either case the element and the supporting or bounding surfaces are co-axial to the axis of pivoting of the arm. In each case it will be seen that the expandable element, when expanded under fluid pressure, will cause the movable arm element to lock on or in the support and prevent rotation of the movable element relative to the support.

Since one face of the expandable element will always be in contact with the support which in general can be taken to be stationary, there is no difficulty about providing for a fluid connection through the support to the expandable element.

Preferably bearing means is provided for the movable arm element within the support additional to any bearing surface provided by the expandable element and preferably the material from which the expandable element is formed and the material of at least the surface in contact with the expandable element and which has to move relative thereto, is selected so as to be compatible with the wear which will inevitably occur with relative movement of the arm element and the expandable element.

In a preferred embodiment of the invention, the fluid which is supplied to the expandable element is an oil such as is used in hydraulic braking systems. and an air/oil intensifier is provided for amplifying airline pressure (typically 60 to 80 psi) to a higher oil pressure by providing a large diaphragm over which the air pressure acts and a smaller diameter piston movable in a cylinder containing the oil. Air pressure acting over the larger diameter is thus converted in the ratio of the areas to a high pressure acting over the smaller area of the piston on the oil.

A conventional control valve may be provided for supplying air under pressure to the air oil intensifier and for venting the pressurized space in the intensifier when the pressure is to be released.

The invention will now be described by way of example with reference to the accompanying drawings in which:

FIG. 1 illustrates schematically an external locking device, and

FIG. 2 an internal locking device for arresting movement of a movable arm element in a multiple arm assembly such as a robot arm.

DETAILED DESCRIPTION OF THE DRAWINGS

Figure 1:
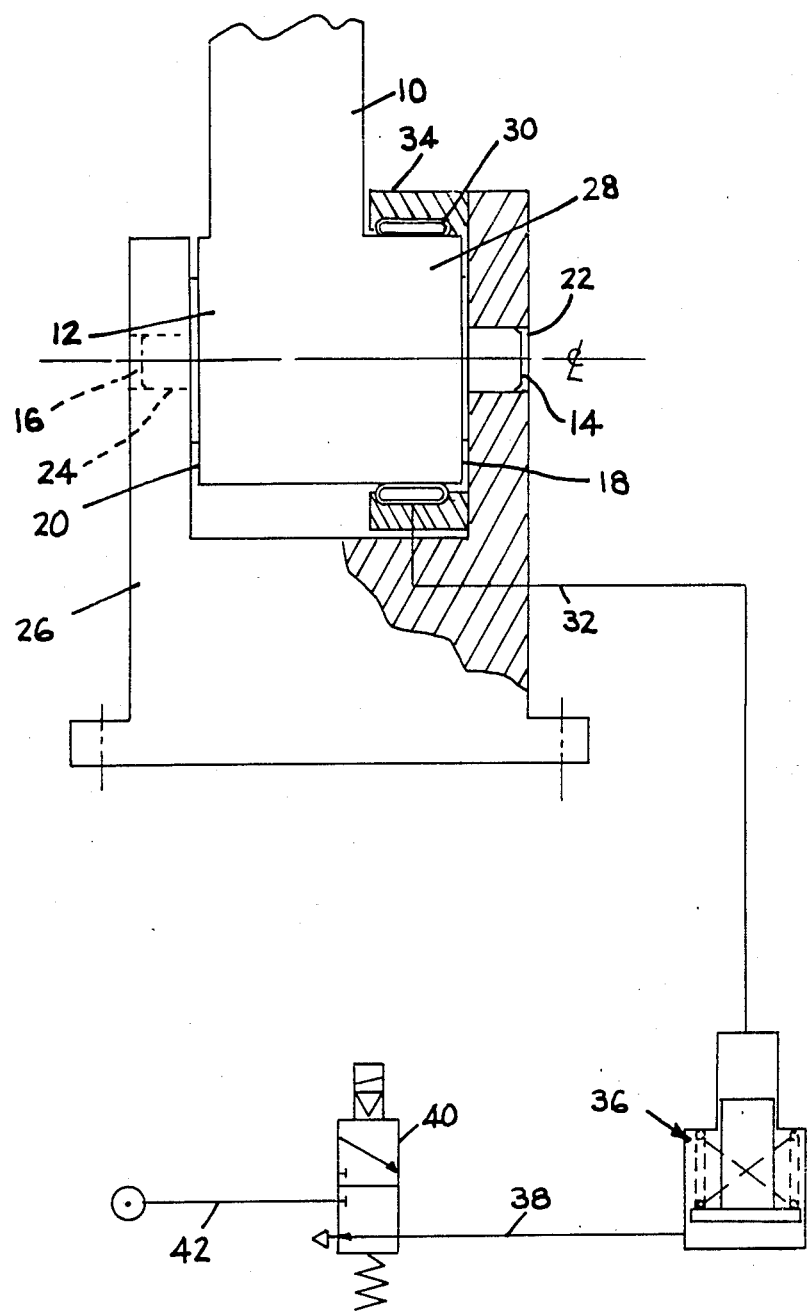

In FIG. 1, a movable arm 10 such as the final movable element of a multiple element robotic arm assembly includes an enlarged generally cylindrical inboard end 12 having stub axles 14 and 16 extending from opposite flat end faces 18 and 20 respectively.

The stub axles are co-axial and are located within and run in appropriately sized and aligned circular apertures 22 and 24 in a housing 26 forming a support for the arm 10. The stub axles 14 and 16 in the apertures 22 and 24 constitute bearing means for the movable arm in the housing 26.

The arm 10 will be movable relative to the housing 26, so that the arm can be moved to perform a desired function. This movement of the arm has to be highly accurate so that the tip of the arm can be positioned precisely in each operating cycle, and a system, such as a system of meshing gears, will control relative movement between the parts. This movement control mechanism is not shown in the Figures.

The arm 10 extends off center from the enlarged cylindrical end 20 so that there is an exposed cylindrical surface 28.

Around the surface 28 is fitted an expandable element 30 in the form of an annular sleeve element to which oil can be supplied under pressure along a fluid line (shown diagrammatically only) 32. The line passes through the housing 26 and a ring 34 which forms an annular support element for the sleeve 30.

The ring 34 is shown as being separate from but secured to the internal wall of the housing 26.

The oil line 32 is supplied with oil under high pressure from an air/oil intensifier unit generally designated 36. The air is supplied to the latter via a line 38 from a control valve 40 supplied with air from an airline 42.

Figure 2:
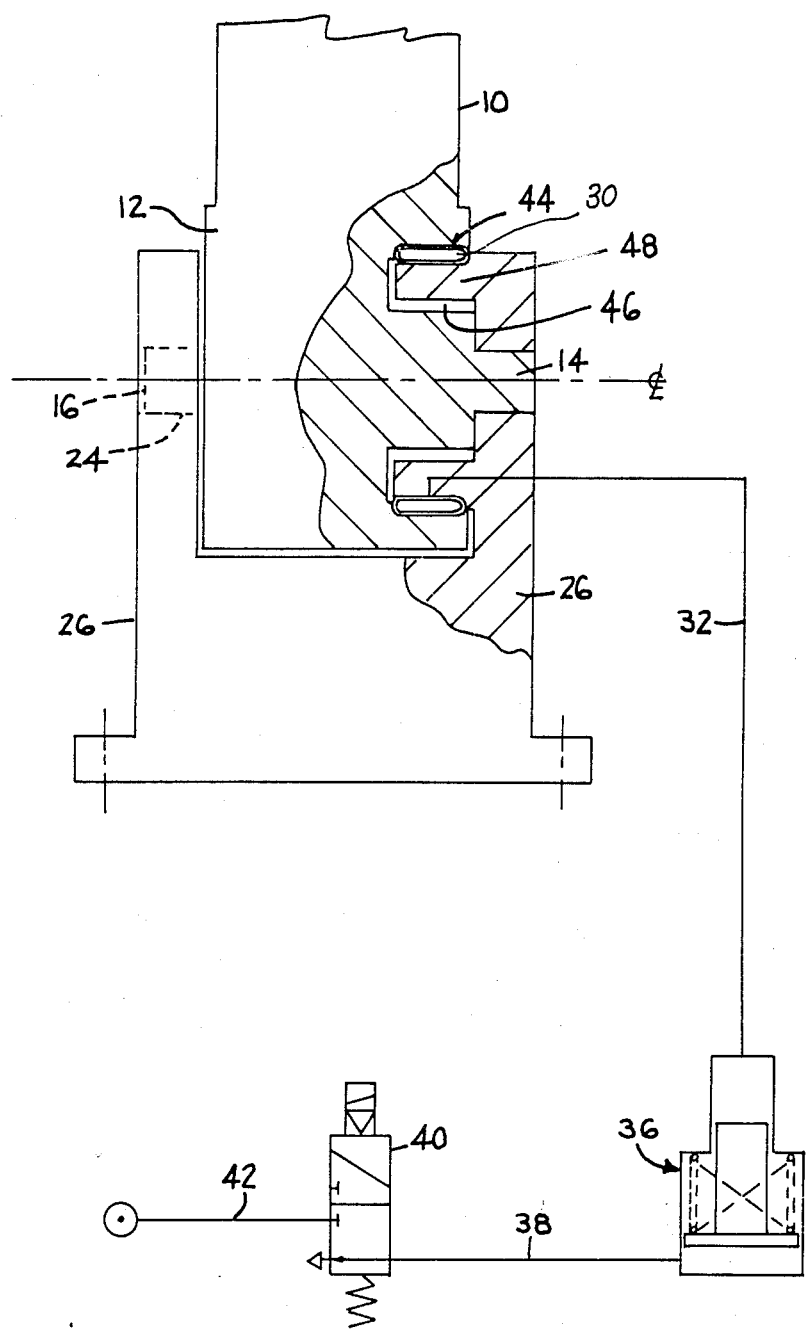

FIG. 2 shows a similar arrangement of locking device and similar items have been referenced by the same reference numerals. Unlike the arrangement in FIG. 1 the arm 10 has an internal cylindrical face 44 within an annular recess 46 in an end face of the cylindrical end of the arm 10, and the wall of the housing 26 which faces this annular recess 46 is formed with an annular upstand 48 which fits into the recess and provides the requisite clearance between its outer surface and the cylindrical face 44. The expandable sleeve 30 is sandwiched between the cylindrical face 44 and the annular upstand 48.

Pressurizing the oil in the element 30 expands the latter and causes the locking effect as previously described.

Although the drawings show a joint between an arm and a fixed housing, the invention can also be applied in an elbow joint between two arms, both of which are movable. The drawings also show only one plane of movement between the arm 10 and the housing 26, but the device is capable of being applied to joints having freedom of movement in more than one plane.

I claim:

1. A locking device for locking up a movable arm assembly such as a robot arm assembly device comprising:
    a longitudinal extending movable arm element having a first end,
    a support extending around the first end of the movable arm element and pivotally connected to the arm element supporting the arm element whilst permitting it to pivot so as to alter the direction in which it extends, and
    an expandable annular element located directly between radially separated opposed annular faces which respectively move with the movable arm element and form part of the support therefor, the expandable element having a fluid connection leading to means for supplying hydraulic oil under pressure to the interior of the expandable element to expand same and cause the movable arm element to lock relative to the support therefor until the hydraulic oil pressure is released, an air pressure-to-oil pressure intensifier for converting air line pressure to a higher oil pressure by providing a large diameter piston over which the air pressure acts and a small diameter piston movable in a cylinder containing the oil, and a control valve for supplying air under pressure from a source thereof to the air pressure-to-oil pressure intensifier and for venting the pressurized air therein when the pressure is to be released.

2. A locking device as claimed in claim 1, wherein the expandable element is located between an external cylindrical surface of a knuckle at the first end of the movable arm element and an outer bounding sleeve of the support for the movable arm element.

3. A locking device as claimed in claim 1, wherein the annular expandable element is sandwiched between an internal cylindrical face of a circular recess formed in an end face of one end of the movable arm element which is located within the support therefor, and wherein the support includes a cylindrical protrusion which fits into the recess and provides an external cylindrical surface for the expandable element.

4. A locking device as claimed in claim 1, wherein the material from which the expandable element is formed and the material of at least one of said faces is selected so as to be compatible with the wear which will inevitably occur with relative movement of the arm element and the expandable element.

5. A locking device for locking up a movable arm assembly such as a robot arm assembly device comprising:
    a longitudinal extending movable arm element having a first end,
    a support extending around the first end of the movable arm element and pivotally connected to the arm element supporting the arm element whilst permitting it to pivot so as to alter the direction in which it extends, and
    an expandable annular element located directly between radially separated opposed annular faces which respectively move with the movable arm element and form part of the support therefor, the expandable element having a fluid connection leading to means for supplying hydraulic oil under pressure to the interior of the expandable element to expand same and cause the movable arm element to lock relative to the support therefor until the hydraulic oil pressure is released, said support and arm element having cooperating elements with bearing surfaces in addition to the bearing surface provided by the expandable element, said cooperating elements including at least one axle member on said arm element and at least one aperture formed in said support into which said axle member protrudes.

* * * * *